(12) United States Patent
Griot et al.

(10) Patent No.: US 8,761,303 B2
(45) Date of Patent: Jun. 24, 2014

(54) UNEQUAL MULTIPATH PROTECTION OF DIFFERENT FRAMES WITHIN A SUPERFRAME USING DIFFERENT CYCLIC PREFIX LENGTHS

(75) Inventors: Miguel Griot, San Diego, CA (US); Pranav Dayal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 436 days.

(21) Appl. No.: 12/543,441

(22) Filed: Aug. 18, 2009

(65) Prior Publication Data

US 2010/0118806 A1    May 13, 2010

Related U.S. Application Data

(60) Provisional application No. 61/114,402, filed on Nov. 13, 2008.

(51) Int. Cl.
*H04K 1/02*    (2006.01)
*H04L 25/03*   (2006.01)
*H04L 25/49*   (2006.01)

(52) U.S. Cl.
USPC ............ 375/296; 375/135; 375/146; 375/260

(58) Field of Classification Search
USPC ......... 375/130–132, 135, 140, 146, 259–260, 375/295–296
See application file for complete search history.

(56) References Cited

U.S. PATENT DOCUMENTS

| 5,852,630 | A  | * | 12/1998 | Langberg et al. ............. 375/219 |
| 6,714,511 | B1 |   | 3/2004  | Sudo et al. |
| 2004/0160987 | A1 | * | 8/2004 | Sudo et al. .................... 370/480 |
| 2008/0084845 | A1 |   | 4/2008 | Kuchibhotla et al. |
| 2008/0130506 | A1 |   | 6/2008 | Talwar et al. |
| 2009/0082002 | A1 | * | 3/2009 | Kim et al. ..................... 455/418 |
| 2009/0219842 | A1 | * | 9/2009 | Moon et al. ................... 370/294 |
| 2010/0027486 | A1 |   | 2/2010 | Gorokhov et al. |
| 2010/0220666 | A1 | * | 9/2010 | Imamura et al. .............. 370/329 |

FOREIGN PATENT DOCUMENTS

| CN | 1525675 A     |   | 9/2004  |
| CN | 1960350 A     |   | 5/2007  |
| CN | 101060513 A   |   | 10/2007 |
| EP | 1755301       |   | 2/2007  |
| JP | 2003023410 A  |   | 1/2003  |
| JP | 2008244851 A  |   | 10/2008 |
| WO | WO2007074841  | * | 5/2007  |
| WO | 2008052026 A2 |   | 5/2008  |
| WO | 2008084634 A1 |   | 7/2008  |

OTHER PUBLICATIONS

International Search Report and Written Opinion—PCT/US2009/063807,International Search Authority—European Patent Office—Aug. 12, 2010.
Shkumbin, "The Draft IEEE 802.16m System Description Document," IEEE Broadband Wireless Access Working Group, 2008, 1-122.
Taiwan Search Report—TW098138473—TIPO—Aug. 19, 2013.
Hu W., et al., "General Superframe Structure and General Frame Structure", IEEE 802. 22-07/502r3, IEEE 802.22 Wireless RANs, 2007.
Lee M., et al., "Proposal for IEEE 802.16m Super-frame Header Design", IEEE C802.16m-08/489r3, IEEE 802.16 Broadband Wireless Access Working Group, pp. 1-12, 2008.

* cited by examiner

*Primary Examiner* — Sam K Ahn
*Assistant Examiner* — James M Perez
(74) *Attorney, Agent, or Firm* — Tyler J. Overall

(57) ABSTRACT

Techniques for providing multipath protection of a portion of a frame classified as having a first importance level (e.g., critical) are provided. Different cyclic prefix lengths may be used, depending on whether a frame contains information deemed critical.

24 Claims, 8 Drawing Sheets

| Nominal Channel Bandwidth (MHz) | | 5 | 7 | 8.75 | 10 | 20 |
|---|---|---|---|---|---|---|
| Over-Sampling Factor | | 28/25 | 8/7 | 8/7 | 28/25 | 28/25 |
| Sampling Frequency (MHz) | | 5.6 | 8 | 10 | 11.2 | 22.4 |
| FFT size | | 512 | 1024 | 1024 | 1024 | 2048 |
| Sub-Carrier Spacing (kHz) | | 10.9375 | 7.8125 | 9.765625 | 10.9375 | 10.9375 |
| Useful Symbol Time Tu (µs) | | 91.429 | 128 | 102.4 | 91.429 | 91.429 |
| Cyclic Prefix (CP) Tg=1/8 Tu | Symbol time Ts (µs) | 102.857 | 144 | 115.2 | 102.857 | 102.857 |
| | # OFDM symbols per frame | 48 | 34 | 43 | 48 | 48 |
| | Idle time (µs) | 62.86 | 104 | 46.40 | 62.86 | 62.86 |
| Cyclic Prefix (CP) Tg=1/16Tu | Symbol time Ts (µs) | 97.143 | | | 97.143 | 97.143 |
| | # OFDM symbols per frame | 51 | | | 51 | 51 |
| | Idle time (µs) | 45.71 | | | 45.71 | 45.71 |

UNEQUAL MULTIPATH PROTECTION OF DIFFERENT FRAMES WITHIN A SUPERFRAME USING DIFFERENT CYCLIC PREFIX LENGTHS

CLAIM OF PRIORITY

This application claims the benefit of priority from U.S. Provisional Patent Application Ser. No. 61/114,402 entitled "Unequal Multipath Protection of Different IEEE 802.16m Frames within a Superframe using Different Cyclic Prefix Lengths" and filed Nov. 13, 2008, which is assigned to the assignee hereof and is fully incorporated herein by reference for all purposes.

TECHNICAL FIELD

The present disclosure generally relates to communication, and more specifically, to providing multipath protection of a portion of a frame classified as relatively important or critical.

BACKGROUND

In the Institute of Electrical and Electronics Engineers (IEEE) 802.16m System Description Document (SDD), structure of a frame is defined as a 20 ms superframe divided into four frames of 5 ms. Each superframe has a header at the beginning of the first frame. The SDD provides for two possible cyclic prefix (CP) lengths. The first length is ⅛ of the useful OFDM (Orthogonal Frequency-Division Multiplexing) symbol time, and the second length is 1/16 of the useful OFDM symbol time. The SDD is not explicit whether all four frames within a superframe must use the same CP length.

SUMMARY

Certain embodiments of the present disclosure provide a method for protecting information transmitted in a wireless communication system. The method generally includes selecting a first cyclic prefix for a first data frame containing information classified with a first importance level, selecting a second cyclic prefix length for a second data frame that does not contain information classified with the first importance level, and generating a superframe comprising, at least the first data frame having a cyclic prefix of the first cyclic prefix length and the second data frame having a cyclic prefix of the second cyclic prefix length.

Certain embodiments of the present disclosure provide an apparatus for protecting information transmitted in a wireless communication system. The apparatus generally includes logic for selecting a first cyclic prefix for a first data frame containing information classified with a first importance level, logic for selecting a second cyclic prefix length for a second data frame that does not contain information classified with the first importance level, and logic for generating a superframe comprising, at least the first data frame having a cyclic prefix of the first cyclic prefix length and the second data frame having a cyclic prefix of the second cyclic prefix length.

Certain embodiments of the present disclosure provide an apparatus for protecting information transmitted in a wireless communication system. The apparatus generally includes means for selecting a first cyclic prefix for a first data frame containing information classified with a first importance level, means for selecting a second cyclic prefix length for a second data frame that does not contain information classified with the first importance level, and means for generating a superframe comprising, at least the first data frame having a cyclic prefix of the first cyclic prefix length and the second data frame having a cyclic prefix of the second cyclic prefix length.

Certain embodiments of the present disclosure provide a computer-program product for protecting information transmitted in a wireless communication system, comprising a computer readable medium having instructions stored thereon, the instructions being executable by one or more processors. The instructions generally including instructions for selecting a first cyclic prefix for a first data frame containing information classified with a first importance level, instructions for selecting a second cyclic prefix length for a second data frame that does not contain information classified with the first importance level, and instructions for generating a superframe comprising, at least the first data frame having a cyclic prefix of the first cyclic prefix length and the second data frame having a cyclic prefix of the second cyclic prefix length.

BRIEF DESCRIPTION OF THE DRAWINGS

Aspects and embodiments of the disclosure will become more apparent from the detailed description set forth below when taken in conjunction with the drawings in which like reference characters identify correspondingly throughout.

FIG. 5 illustrates a table defining OFDMA (Orthogonal Frequency-Division Multiple Access) parameters in the IEEE 802.16m System Description Document.

DETAILED DESCRIPTION

Figure 1:
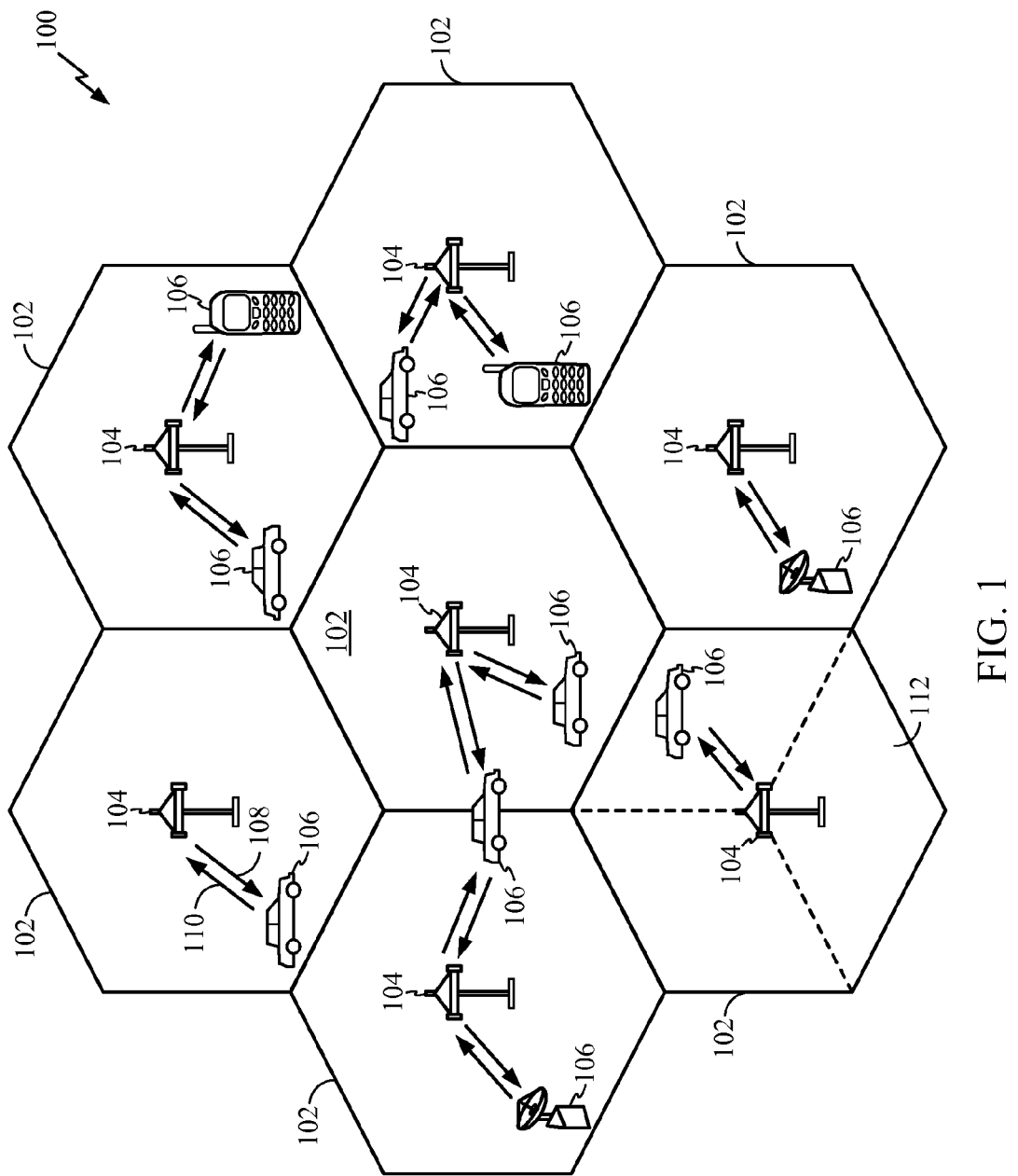
FIG. 1 illustrates an example wireless communication system, in accordance with certain embodiments of the present disclosure.

Certain embodiments are described herein with reference to the drawings, wherein like reference numerals are used to refer to like elements throughout. In the following description, for purposes of explanation, numerous specific details are set forth in order to provide a thorough understanding of certain embodiments. However, it may be that such embodiment(s) can be practiced without these specific details. In other instances, well-known structures and devices are shown in block diagram form in order to facilitate describing certain embodiments.

Exemplary Wireless Communication System

The techniques described herein may be used for various broadband wireless communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

One example of a communication system based on an orthogonal multiplexing scheme is a WiMAX system. WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX is based on OFDM and OFDMA and offers the full mobility of cellular networks at broadband speeds.

IEEE 802.16x is an emerging standard organization to define an air interface for fixed and mobile broadband wireless access (BWA) systems. These standards define at least four different physical layers (PHYs) and one media access control (MAC) layer. The OFDM and OFDMA physical layer of the four physical layers are the most popular in the fixed and mobile BWA areas, respectively.

FIG. 1 illustrates an example of a wireless communication system 100 in which embodiments of the present disclosure may be employed. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink 108, and a communication link that facilitates transmission from a user terminal 106 to a base station 104 may be referred to as an uplink 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
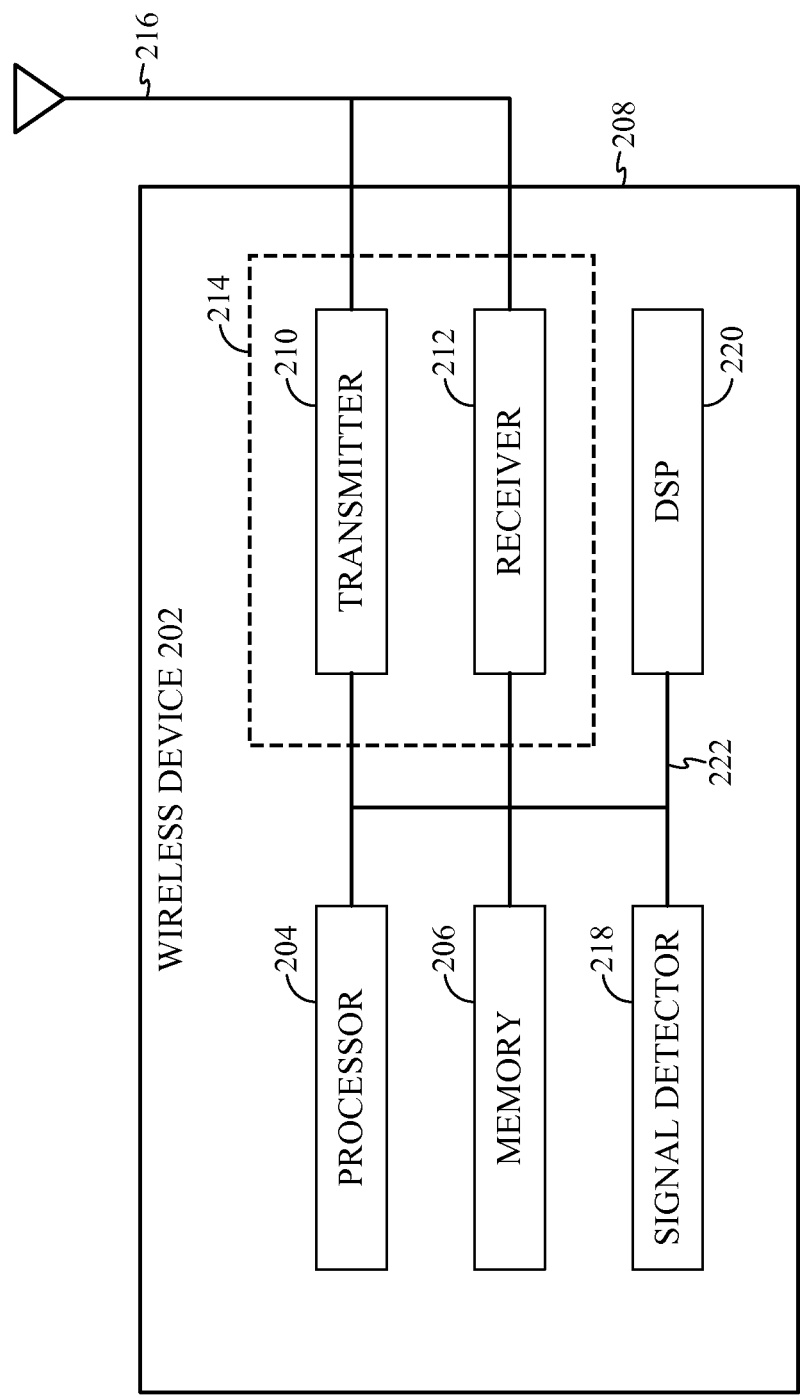
FIG. 2 illustrates various components that may be utilized in a wireless device in accordance with certain embodiments of the present disclosure.

FIG. 2 illustrates various components that may be utilized in a wireless device 202 that may be employed within the wireless communication system 100. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, pilot energy per pseudonoise (PN) chips, power spectral density and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
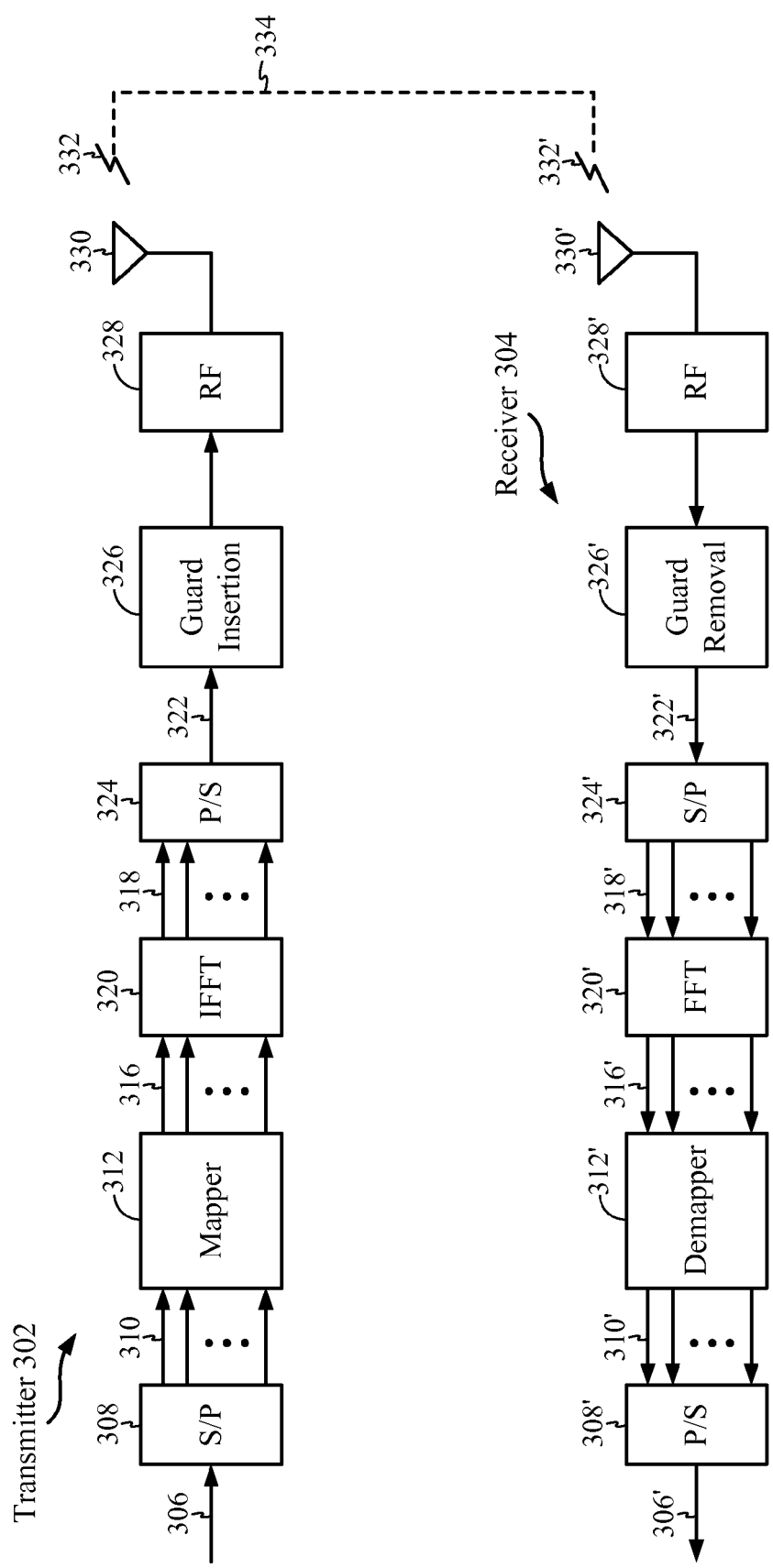
FIG. 3 illustrates an example transmitter and an example receiver that may be used within a wireless communication system that utilizes orthogonal frequency-division multiplexing and orthogonal frequency division multiple access (OFDM/OFDMA) technology in accordance with certain embodiments of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into N parallel data streams 310.

The N parallel data streams 310 may then be provided as input to a mapper 312. The mapper 312 may map the N parallel data streams 310 onto N constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output N parallel symbol streams 316, each symbol stream 316 corresponding to one of the N orthogonal subcarriers of the inverse fast Fourier transform (IFFT) 320. These N parallel symbol streams 316 are represented in the frequency domain and may be converted into N parallel time domain sample streams 318 by an IFFT component 320.

A brief note about terminology will now be provided. N parallel modulations in the frequency domain are equal to N modulation symbols in the frequency domain, which are equal to N mapping and N-point IFFT in the frequency domain, which is equal to one (useful) OFDM symbol in the time domain, which is equal to N samples in the time domain. One OFDM symbol in the time domain, $N_s$, is equal to $N_{cp}$ (the number of guard samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of the guard insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless device 202 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a wireless channel 334. When a signal 332' is received by an antenna 330', the received signal 332' may be downconverted to a baseband signal by an RF front end 328'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the N parallel time-domain symbol streams 318', each of which corresponds to one of the N orthogonal subcarriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by the mapper 312 thereby outputting N parallel data streams 310'. A P/S converter 308' may combine the N parallel data streams 310' into a single data stream 306'. Ideally, this data stream 306' corresponds to the data 306 that was provided as input to the transmitter 302.

Exemplary Protection for Unequal Multipath from Different 802.16M Frames within a Superframe using Different Cyclic Prefix Lengths As used herein, the term critical generally refers to any information that may be classified as having a relatively higher importance level than other data. While the example embodiments below may refer to information as critical, it should be understood that the techniques herein may be applied to any type of data that might be distinguished in some manner from other data, whether it be based on actual (or perceived) importance or some other type of consideration.

Figure 4:
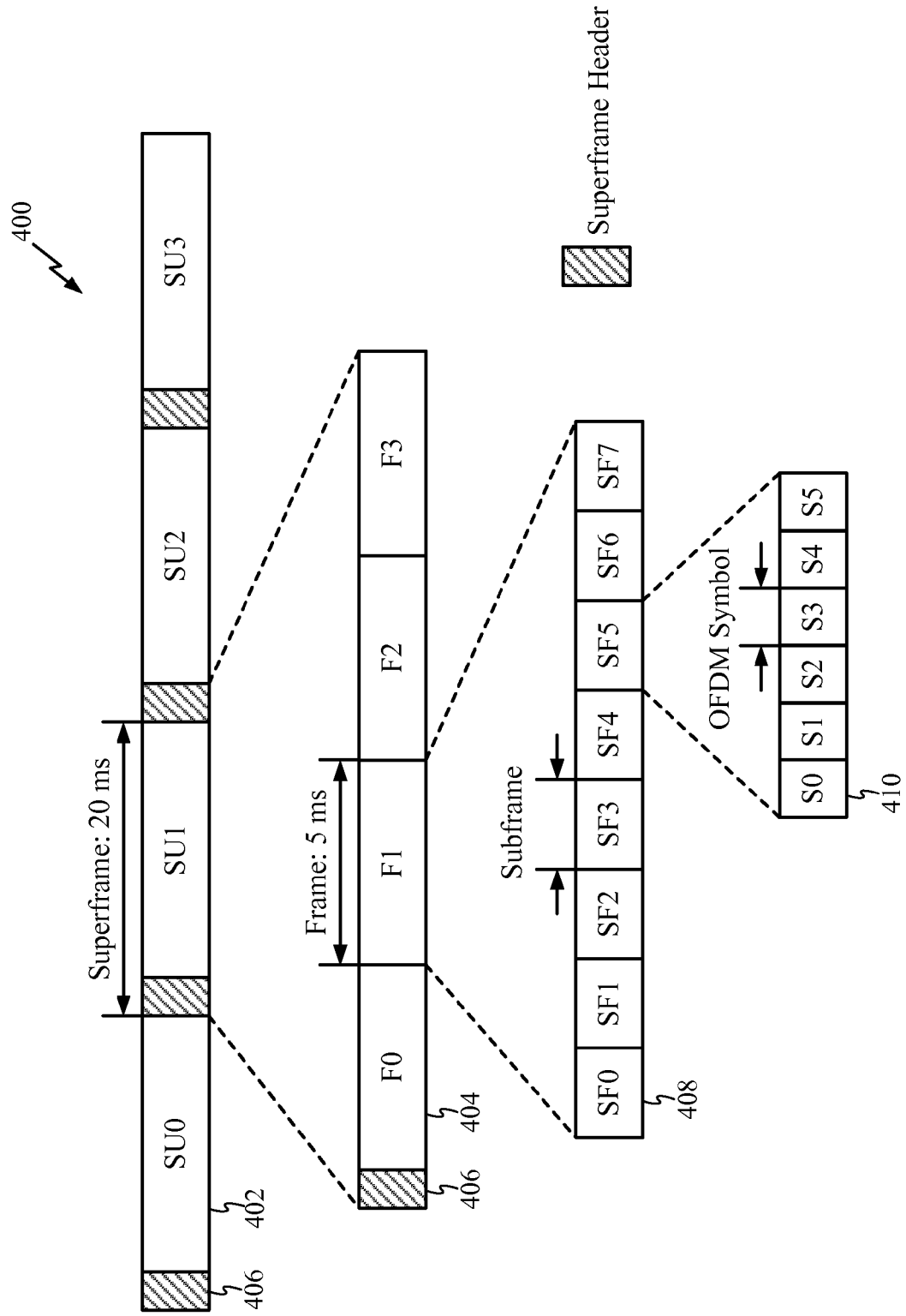
FIG. 4 illustrates structure of a frame in the IEEE 802.16m standard.

FIG. 4 illustrates the structure of a frame in IEEE 802.16m standard System Description Document (SDD). As shown, the IEEE 802.16m frame structure comprises a 20 ms superframe 402. Each superframe contains a superframe header 406, which is located at the beginning of the superframe. Certain information may be classified as having a particular importance level (e.g., critical or relatively more important than other portions of data in a frame or superframe). For example, the superframe header contains information about the network such as control information, synchronization signals, etc. As this information enables the mobile station to enter the network or synchronize with the base station, it may be considered critical.

A superframe is also divided into four frames 404, each being 5 ms long. Every frame is divided into 8 subframes 408. A subframe is divided into a plurality of OFDM Symbols 410. An OFDM symbol contains cyclic prefix and data, whose durations are Tg and Tu, respectively. The cyclic-prefix is a special portion at the beginning of an OFDM symbol that is included to improve the immunity of the OFDM symbol to multipath signals. The useful symbol time Tu, is the inverse of the subcarrier spacing (i.e., distance between orthogonal subcarriers). As illustrated in FIG. 4, the first frame of a superframe may contain the superframe header 406. For certain embodiments, a subframe of a frame may contain the superframe header.

FIG. 5 illustrates a table 500 defining OFDMA (Orthogonal Frequency-Division Multiple Access) parameters in the IEEE 802.16m standard. As illustrated in the table, two cyclic prefix lengths (Tg) are defined in the IEEE 802.16m standard. The first cyclic prefix length is defined as ⅛ of a useful symbol time (Tu), and the second cyclic prefix length is defined as 1/16 of a useful symbol time (Tu).

There is no explicit constraint in the IEEE 802.16m SDD regarding whether all frames within a superframe should use the same cyclic prefix length. For certain embodiments, the superframe header 406 contains critical information. Therefore, the superframe header 406 should be well protected.

Figure 6:
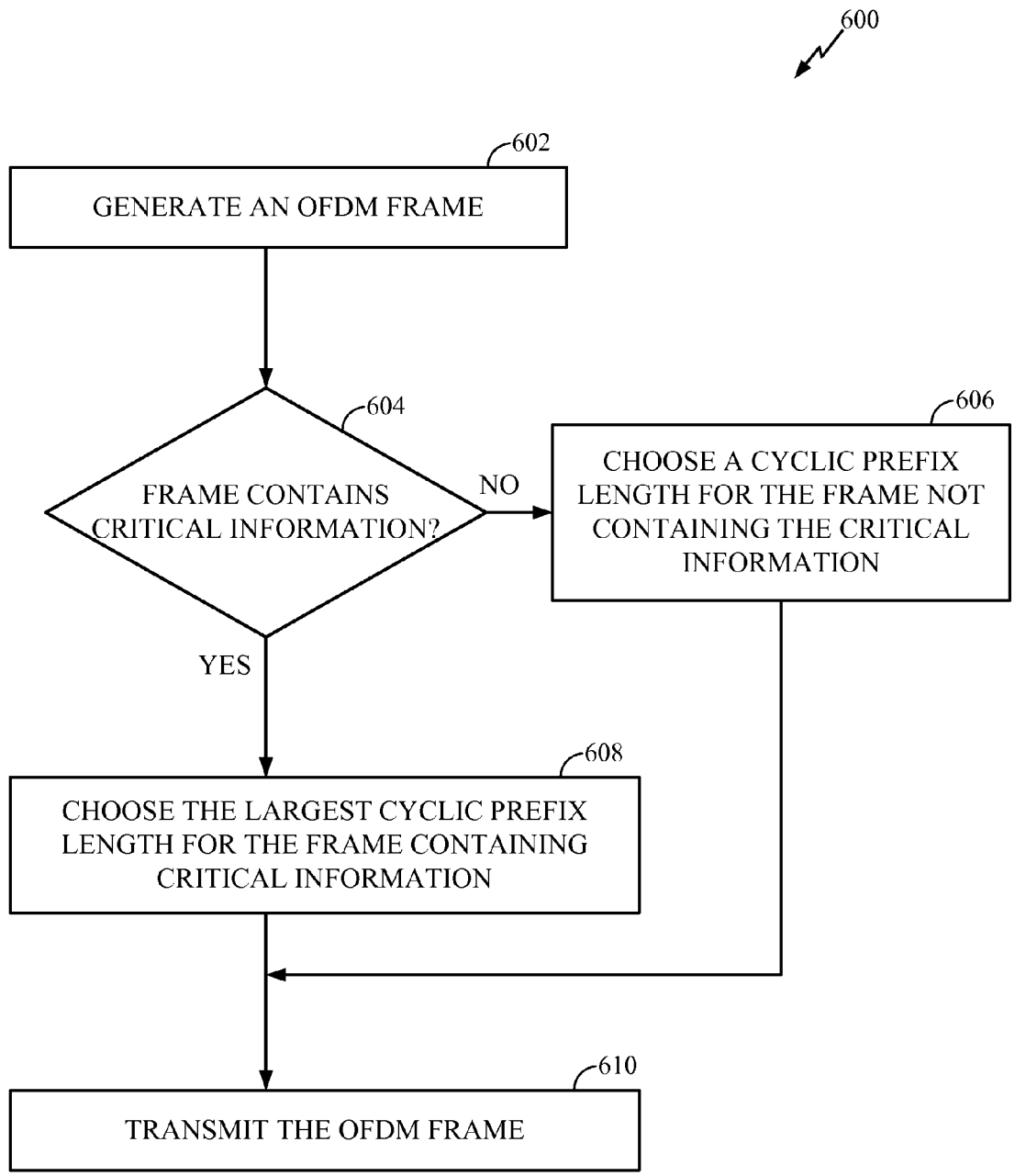
FIG. 6 illustrates example operations for providing protection for critical information in a frame in accordance with certain embodiments of the present disclosure.

FIG. 6 illustrates example operations 600 for providing protection for critical information in a frame in accordance with certain embodiments of the present disclosure. At 602, an OFDMA frame 404 is generated. If this is the first frame within a superframe, it may contain the superframe header 406, which may be considered critical information (e.g., classified as having a first importance level). At 608, a first cyclic prefix length (e.g., the largest ⅛ Tu), which provides relatively high protection on the critical information against multipath, may be selected for the frame that contains critical information.

At 606, a cyclic prefix of a second length (e.g., ⅛ Tu or 1/16 Tu) may be selected for the frames containing data having a second (less) importance level (e.g., frames not containing critical information). For certain embodiments, the second length is shorter than the first length. In another embodiment, the second length is the same length as the first length. At 610, the frame having the critical information and the frame not having the critical information are transmitted.

According to certain aspects, varying degrees of importance may be accommodated and, thus, more than two cyclic prefix lengths may be used. A superframe may, for example, use a first CP length for a frame with a header, a second CP length for some data deemed relatively important, and a third CP length for some other data deemed relatively less important.

For certain embodiments, because the first frame of a superframe contains the superframe header (406), the first frame may use the largest of the two possible cyclic prefix lengths, irrespective of which cyclic prefix length (e.g., $\frac{1}{8}T_u$ or $\frac{1}{16}T_u$) is used for the other frames.

Figure 7:
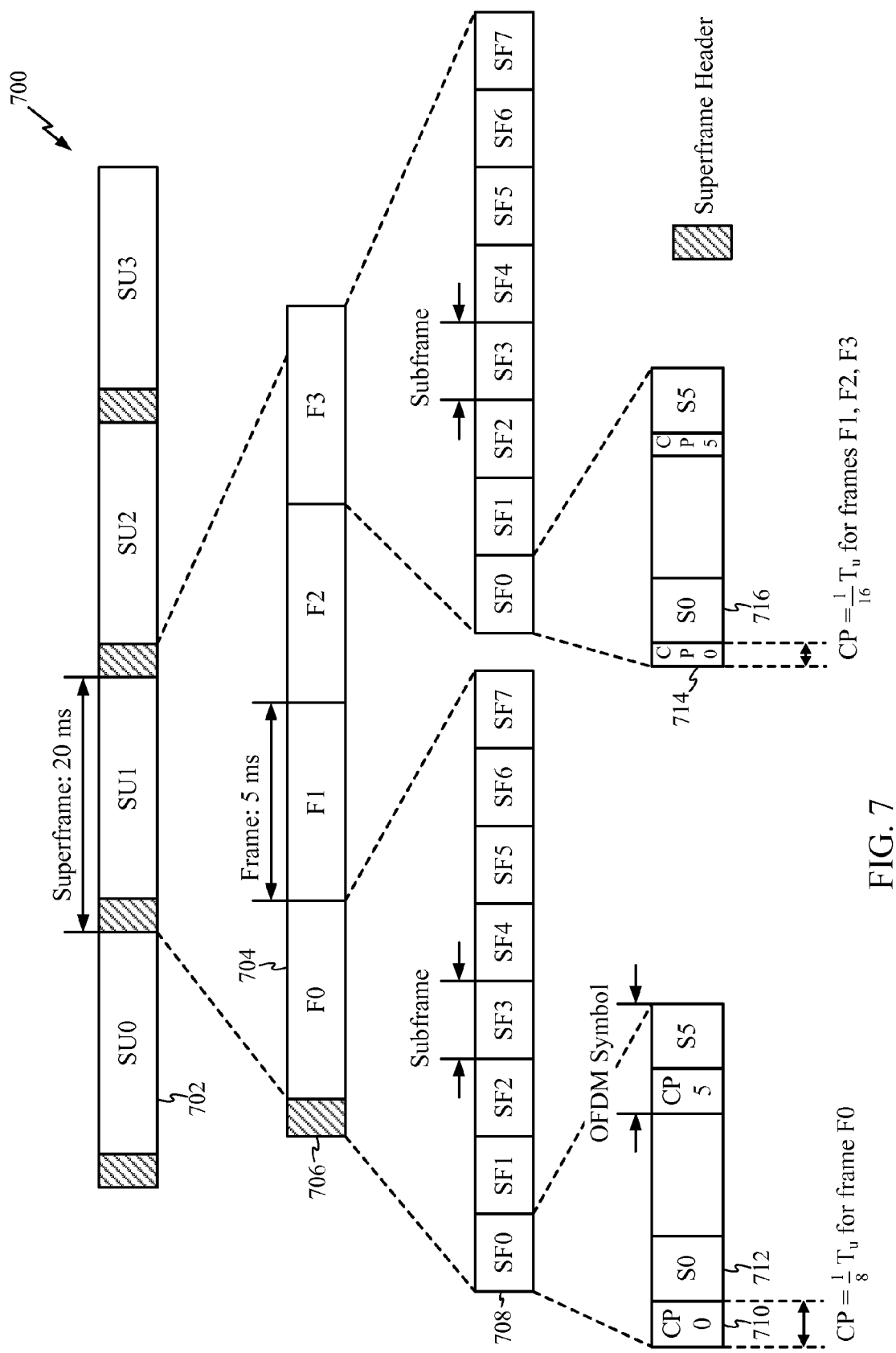
FIG. 7 illustrates an example of the proposed frame structure in accordance with certain embodiments of the present disclosure.

FIG. 7 illustrates the use of multiple cyclic prefix lengths for different frames in a superframe in accordance with certain embodiments of the present disclosure. As illustrated, the first frame 704 may use a larger cyclic prefix length for more protection against multipath and the other frames may use a similar or a different cyclic prefix length. For certain embodiments, the first frame of the superframe may use a cyclic prefix of length 710 of $\frac{1}{8}T_u$, and the other three frames in a superframe 702 may use a cyclic prefix length 714 of $\frac{1}{16}T_u$. Therefore, the first frame (and consequently, the superframe header 706 contained in the first frame) may receive better multipath protection.

Using the smallest cyclic prefix length of $\frac{1}{16}T_u$ for all the frames in a superframe may result in the smallest time overhead compared to the other cases using larger cyclic prefix lengths. For example, as shown in Table 400, the useful OFDMA symbol duration is 91.429 μs. In the case of four frames, each having a cyclic prefix of $\frac{1}{16}T_u$, there are 51 OFDMA symbols in each frame and 51*4=204 OFDMA symbols in a superframe. Therefore, the time overhead may be 6.7% (i.e., (4*5000 μs−204*91.429 μs)/20000 μs).

For certain embodiments of the present disclosure, the first frame may have a cyclic prefix length of $\frac{1}{8}T_u$ and the other three frames may have a cyclic prefix of $\frac{1}{16}T_u$. Therefore, there will be 201 (i.e., 48+(3*51)) OFDMA symbols in a superframe. The time overhead may be 8.1% (i.e., (4*5000 μs−201*91.429 μs)/20000 μs). Thus, there may approximately be an additional time overhead of 1.4% (i.e., 8.1−6.7) if the larger cyclic prefix is used for the frame containing critical information compared to the case in which all frames use the smallest cyclic prefix length.

As long as system parameter constraints or specifications allow different cyclic prefix lengths, frames or subframes containing critical information may have a larger cyclic prefix length than frames or subframes not having critical information.

Figure 6A:
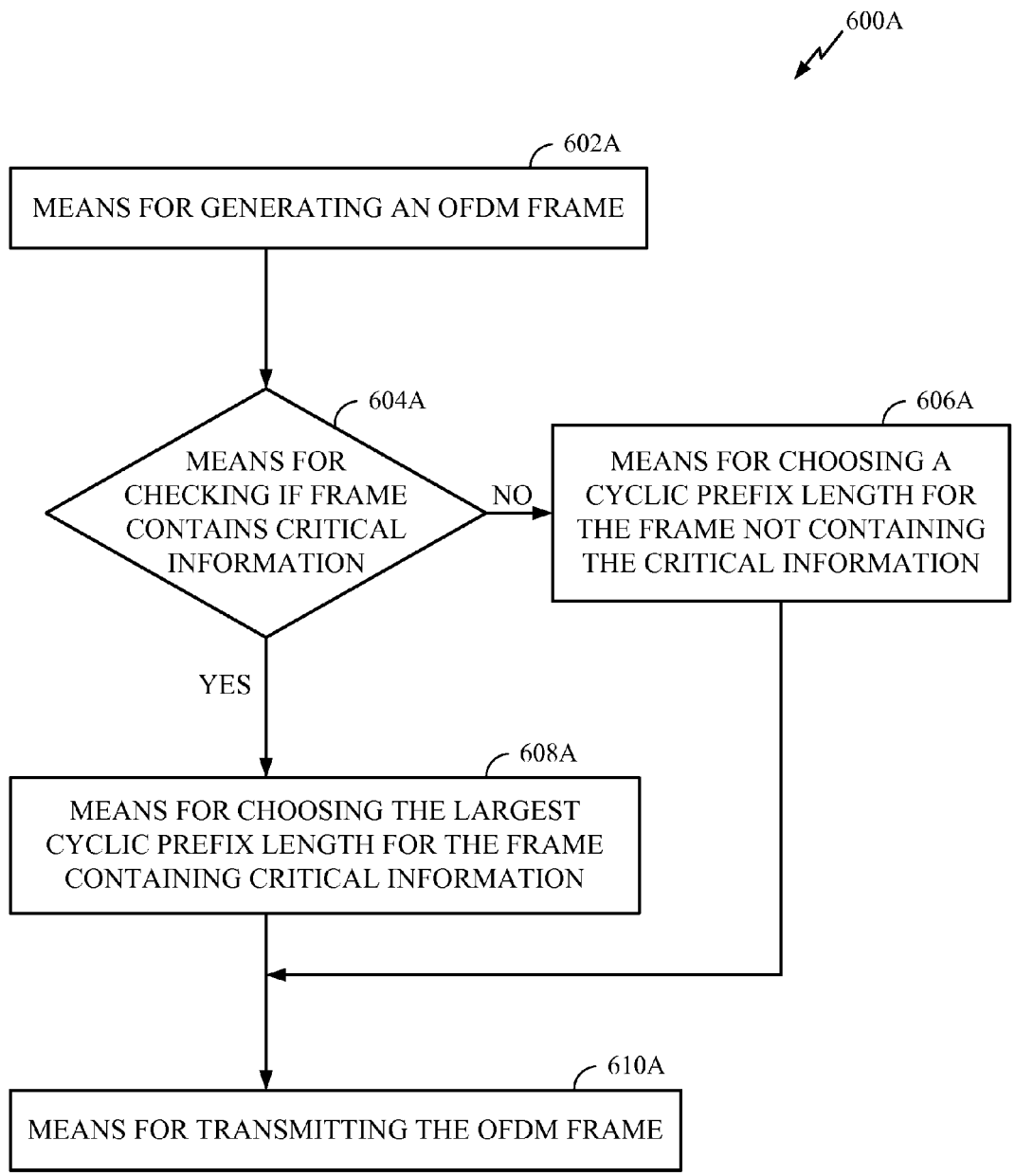
FIG. 6A illustrates example components capable of performing the operations of FIG. 6.

The various operations of methods described above may be performed by various hardware and/or software component(s) and/or module(s) corresponding to means-plus-function blocks illustrated in the figures. Generally, where there are methods illustrated in figures having corresponding counterpart means-plus-function figures, the operation blocks correspond to means-plus-function blocks with similar numbering. For example, operations 600 illustrated in FIG. 6 corresponds to means-plus-function blocks 600A illustrated in FIG. 6A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for protecting information transmitted in a wireless communication system, comprising:
    identifying a first cyclic prefix length associated with header information classified with a first importance level;
    identifying a first data frame containing the header information classified with the first importance level;
    selecting the first cyclic prefix length for the first data frame based on a determination that the first data frame comprises the header information for at least the first data frame and a second data frame;
    applying a cyclic prefix of the first cyclic prefix length to each symbol of the first data frame;
    selecting a second cyclic prefix length for the second data frame based on a determination that the second data frame comprises information classified with a second importance level, the second importance level being less than the first importance level; and
    generating a superframe comprising at least the first data frame having a cyclic prefix of the first cyclic prefix length and the second data frame having a cyclic prefix of the second cyclic prefix length,
    wherein at least one step of the method is performed by a hardware component.

2. The method of claim 1, wherein the superframe comprises at least a third frame that contains a cyclic prefix of a third cyclic prefix length different than the first and second cyclic prefix lengths.

3. The method of claim 2, wherein the first importance level indicates the first data frame contains header information.

4. The method of claim 1, wherein the first cyclic prefix length corresponds to ⅛ of useful symbol time.

5. The method of claim 1, wherein the second cyclic prefix length corresponds to 1/16 of useful symbol time.

6. The method of claim 1, wherein each frame comprises a plurality of OFDM symbols.

7. An apparatus for protecting information transmitted in a wireless communication system, comprising:
    a processor;
    memory in electronic communication with the processor, the memory storing computer executable instructions that when executed by the processor cause the processor to:
        identify a first cyclic prefix length associated with header information classified with a first importance level;
        identify a first data frame containing the header information classified with the first importance level;
        select the first cyclic prefix length for the first data frame based on a determination that the first data frame comprises the header information for at least the first data frame and a second data frame;
        apply a cyclic prefix of the first cyclic prefix length to each symbol of the first data frame;
        select a second cyclic prefix length for the second data frame based on a determination that the second data frame comprises information classified with a second importance level, the second importance level being less than the first importance level; and
        generate a superframe comprising at least the first data frame having the cyclic prefix of the first cyclic prefix length and the second data frame having the cyclic prefix of the second cyclic prefix length.

8. The apparatus of claim 7, wherein the superframe comprises at least a third frame that contains a cyclic prefix of a third cyclic prefix length different than the first and second cyclic prefix lengths.

9. The apparatus of claim 8, wherein first importance level indicates the first data frame contains header information.

10. The apparatus of claim 7, wherein the first cyclic prefix length corresponds to ⅛ of useful symbol time.

11. The apparatus of claim 7, wherein the second cyclic prefix length corresponds to 1/16 of useful symbol time.

12. The apparatus of claim 7, wherein each frame comprises a plurality of OFDM symbols.

13. An apparatus for protecting information transmitted in a wireless communication system, comprising:
    means for identifying a first cyclic prefix length associated with header information classified with a first importance level;
    means for identifying a first data frame containing the header information classified with the first importance level;
    means for selecting the first cyclic prefix length for the first data frame based on a determination that the first data frame comprises the header information for at least the first data frame and a second data frame;
    means for applying a cyclic prefix of the first cyclic prefix length to each symbol of the first data frame;
    means for selecting a second cyclic prefix length for the second data frame based on a determination that the second data frame comprises information classified with a second importance level, the second importance level being less than the first importance level; and
    means for generating a superframe comprising at least the first data frame having a cyclic prefix of the first cyclic prefix length and the second data frame having a cyclic prefix of the second cyclic prefix length.

14. The apparatus of claim 13, wherein the superframe comprises at least a third frame that contains a cyclic prefix of a third cyclic prefix length different than the first and second cyclic prefix lengths.

15. The apparatus of claim 14, wherein the first importance level indicates the first data frame contains header information.

16. The apparatus of claim 13, wherein the first cyclic prefix length corresponds to ⅛ of useful symbol time.

17. The apparatus of claim 13, wherein the second cyclic prefix length corresponds to 1/16 of useful symbol time.

18. The apparatus of claim 13, wherein each frame comprises a plurality of OFDM symbols.

19. A computer-program product for protecting information transmitted in a wireless communication system, comprising a computer readable storage device storing instructions that when executed by a processor cause the processor to:
- identify a first cyclic prefix length associated with header information classified with a first importance level;
- identify a first data frame containing the header information classified with the first importance level;
- select the first cyclic prefix length for the first data frame based on a determination that the first data frame comprises the header information for at least the first data frame and a second data frame;
- apply a cyclic prefix of the first cyclic prefix length to each symbol of the first data frame;
- select a second cyclic prefix length for the second data frame based on a determination that the second data frame comprises information classified with a second importance level, the second importance level being less than the first importance level; and
- generate a superframe comprising at least the first data frame having a cyclic prefix of the first cyclic prefix length and the second data frame having a cyclic prefix of the second cyclic prefix length.

20. The computer-program product of claim 19, wherein the superframe comprises at least a third frame that contains a cyclic prefix of a third cyclic prefix length different than the first and second cyclic prefix lengths.

21. The computer-program product of claim 20, wherein the first importance level indicates the first data frame contains header information.

22. The computer-program product of claim 19, wherein the first cyclic prefix length corresponds to $1/8$ of useful symbol time.

23. The computer-program product of claim 19, wherein the second cyclic prefix length corresponds to $1/16$ of useful symbol time.

24. The computer-program product of claim 19, wherein each frame comprises a plurality of OFDM symbols.

* * * * *